United States Patent
Yamamoto

(10) Patent No.: US 8,849,486 B2
(45) Date of Patent: Sep. 30, 2014

(54) VEHICLE AND METHOD OF CONTROLLING THE SAME

(75) Inventor: Koji Yamamoto, Okazaki (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 696 days.

(21) Appl. No.: 13/026,393

(22) Filed: Feb. 14, 2011

(65) Prior Publication Data

US 2011/0202222 A1 Aug. 18, 2011

(30) Foreign Application Priority Data

Feb. 12, 2010 (JP) ................................. 2010-028825

(51) Int. Cl.
| | | |
|---|---|---|
| *B60L 9/00* | (2006.01) | |
| *B60W 10/00* | (2006.01) | |
| *B60W 10/08* | (2006.01) | |
| *B60W 20/00* | (2006.01) | |
| *B60L 11/12* | (2006.01) | |
| *B60K 6/445* | (2007.10) | |
| *B60K 6/365* | (2007.10) | |
| *B60W 10/06* | (2006.01) | |
| *B60L 11/14* | (2006.01) | |
| *B60W 10/115* | (2012.01) | |
| *B60L 15/20* | (2006.01) | |
| *B60W 30/19* | (2012.01) | |

(52) U.S. Cl.
CPC ............ *B60L 11/123* (2013.01); *Y02T 10/6239* (2013.01); *Y02T 10/7077* (2013.01); *B60W 20/00* (2013.01); *B60K 6/445* (2013.01); *B60W 10/08* (2013.01); *B60K 6/365* (2013.01); *Y02T 10/6286* (2013.01); *B60W 10/06* (2013.01); *B60W 2540/10* (2013.01); *B60W 2710/083* (2013.01); *Y02T 10/7258* (2013.01); *Y02T 10/646* (2013.01); *B60W 30/19* (2013.01); *B60L 11/14* (2013.01); *B60W 10/115* (2013.01); *Y02T 10/70* (2013.01); *Y02T 10/648* (2013.01); *B60W 2520/10* (2013.01); *B60W 2540/16* (2013.01); *Y02T 10/6217* (2013.01); *B60L 15/2054* (2013.01); *Y10S 903/93* (2013.01)
USPC .......... 701/22; 180/65.265; 903/930

(58) Field of Classification Search
USPC .......... 701/22; 180/65.265; 903/930
See application file for complete search history.

(56) References Cited

U.S. PATENT DOCUMENTS

2007/0298928 A1* 12/2007 Yamanaka et al. ............. 477/15
2008/0236912 A1* 10/2008 Ueoka et al. ................. 180/65.2

FOREIGN PATENT DOCUMENTS

| JP | 2004360672 A | 12/2004 |
|---|---|---|
| JP | 2008201261 A | 9/2008 |
| JP | 2009166516 A | * 7/2009 |

OTHER PUBLICATIONS

English translation of JP 2009166516 A.*

*Primary Examiner* — Fadey Jabr
*Assistant Examiner* — Yazan A Soofi
(74) *Attorney, Agent, or Firm* — Gifford, Krass, Sprinkle, Anderson & Citkowski, P.C.

(57) ABSTRACT

A vehicle has a restriction storing device that stores a plurality of restrictions that are respectively created for a plurality of virtual gear ranges, such that, in each of the virtual gear ranges, required driving force as driving force to be applied to a drive shaft corresponding to the same accelerator operation amount tends to be increased as the vehicle speed is higher, and the required driving force corresponding to the same accelerator operation amount tends to be increased as the virtual gear range is shifted to a lower range when the vehicle speed is constant.

9 Claims, 10 Drawing Sheets

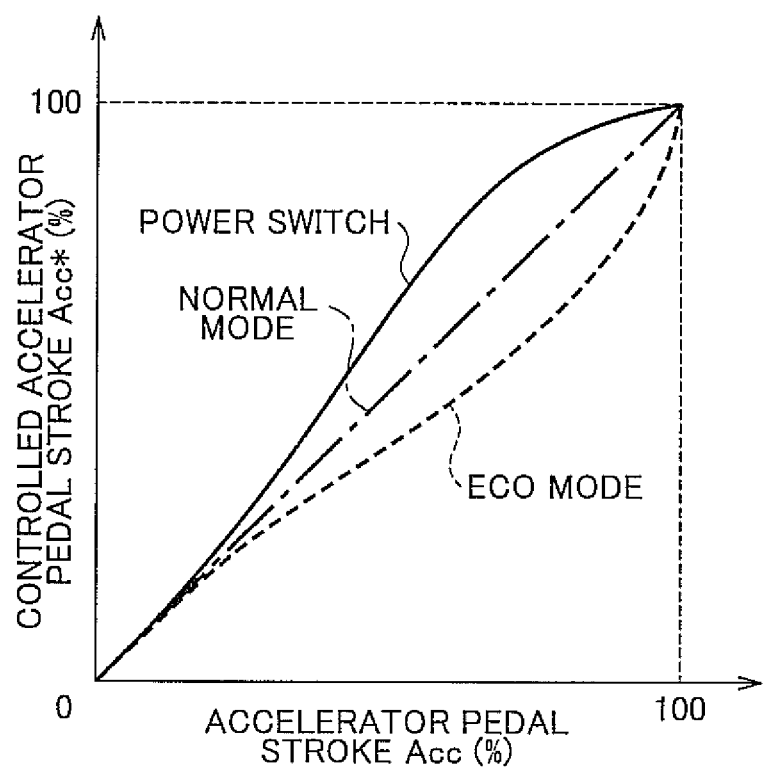

VEHICLE AND METHOD OF CONTROLLING THE SAME

CROSS-REFERENCE TO RELATED APPLICATIONS

This application claims priority to Japanese Patent Application No. 2010-028825 filed on Feb. 12, 2010, which is incorporated herein by reference in its entirety including the specification, drawings and abstract.

BACKGROUND OF THE INVENTION

1. Field of the Invention

The invention relates to a vehicle including at least an electric motor capable of delivering power to a drive shaft coupled to driving wheels and electric storage means capable of supplying and receiving electric power to and from the electric motor, and a method of controlling the vehicle.

2. Description of the Related Art

A hybrid vehicle is known which includes an engine, a planetary gear mechanism having a planetary carrier connected to a crankshaft of the engine and a ring gear connected to a drive shaft coupled to driving wheels, a first motor connected to a sun gear of the planetary gear mechanism, and a second motor connected to the drive shaft, and which permits the driver to select one of a plurality of virtual shift positions (see Japanese Patent Application Publication No. 2008-201261 (JP-A-2008-201261), for example). In the hybrid vehicle of this type, when one of the virtual shift positions is selected by the driver, the lower limit of the engine speed is set based on the selected virtual shift position and the vehicle speed, and the engine is operated at a rotational speed equal to or higher than the lower limit of the engine speed. In this manner, when one of the virtual shift positions is selected by the driver and the accelerator pedal is depressed, the engine speed can be kept high to some extent, thus assuring the output response of the engine.

However, the output response or responsiveness of the driving force for running the vehicle to a shifting operation performed by the driver is not always satisfactory if only the lower limit of the engine speed is set based on the virtual shift position and the vehicle speed as in the hybrid vehicle as described above. For example, some drivers may feel unsatisfied with the acceleration feeling of the vehicle responsive to a shifting operation. On the other hand, other drivers may wish to improve the energy efficiency (fuel efficiency) through shifting operations, in the hybrid vehicle as described above, an electric vehicle, or the like.

SUMMARY OF THE INVENTION

The invention provides a vehicle including at least an electric motor capable of delivering power to a drive shaft coupled to driving wheels and an electric storage device capable of supplying and receiving electric power to and from the electric motor, in which the output characteristic of driving force for running the vehicle in response to a shifting operation is improved, and the energy efficiency is improved through shifting operations.

The vehicle of the invention and the method of controlling the vehicle according to the invention adopt devices or steps as described below.

A first aspect of the invention is concerned with a vehicle including: an electric motor that delivers power to a drive shaft coupled to driving wheels; an electric storage device that supplies and receives electric power to and from the electric motor; an accelerator operation amount obtaining device that obtains an accelerator operation amount as an amount of operation of an accelerator pedal by a driver; a vehicle speed obtaining device that obtains a vehicle speed; a gear range selecting device that permits the driver to select a desired gear range from a normal running range and a plurality of virtual gear ranges; a restriction storing device that stores a plurality of restrictions that are created for the respective virtual gear ranges, so that, in each of said plurality of virtual gear ranges, required driving force as driving force to be applied to the drive shaft corresponding to the same accelerator operation amount tends to be increased as the vehicle speed is higher, and the required driving force corresponding to the same accelerator operation amount tends to be increased as the virtual gear range is shifted to a lower range when the vehicle speed is constant; a required driving force setting device, when one of the virtual gear ranges is selected by the driver, that sets the required driving force corresponding to the accelerator operation amount obtained by the accelerator operation amount obtaining device and the vehicle speed obtained by the vehicle speed obtaining device, using the restriction corresponding to the selected virtual gear range; and a control device that controls the electric motor so that power based on the required driving force set by the required driving force setting device is delivered to the drive shaft.

In the vehicle according to the above aspect of the invention, the restriction storing device stores the plurality of restrictions created so that, in each of the virtual gear ranges, the required driving force as driving force to be applied to the drive shaft, which corresponds to the same accelerator operation amount, tends to be increased as the vehicle speed is higher, and the required driving force corresponding to the same accelerator operation amount tends to be increased as the virtual gear range is shifted to a lower range when the vehicle speed is constant. When one of the virtual gear ranges is selected by the driver, the required driving force corresponding to the accelerator operation amount obtained by the accelerator operation amount obtaining device and the vehicle speed obtained by the vehicle speed obtaining device is set, using the restriction corresponding to the selected virtual gear range, and the electric motor is controlled so that power based on the required driving force is delivered to the drive shaft. With the plurality of restrictions as described above thus created for the respective virtual gear ranges, the output response of the driving force for running the vehicle is enhanced as the vehicle speed is higher when a certain virtual gear range is selected, and the output response of the driving force for running the vehicle is enhanced as the virtual gear range is shifted to a lower range in a condition where the vehicle speed is constant. It is thus possible to accelerate the vehicle with the enhanced output response of the driving force for running the vehicle, by setting one of the virtual gear ranges as the gear range, or shifting the virtual gear range to a lower range. Also, with the above-described restrictions thus created for the respective virtual gear ranges, the increase of the required driving force is restricted to a larger extent as the vehicle speed is lower when a certain virtual gear range is selected, and the increase of the required driving force is restricted to a larger extent as the virtual gear range is shifted to a higher range while the vehicle speed is constant. It is thus possible to reduce or restrict the output of the driving force for running the vehicle and improve the energy efficiency of the vehicle, by setting one of the virtual gear ranges as the gear range, or shifting the virtual gear range to a higher range. Accordingly, in the vehicle according to the above aspect of the invention, the output characteristic of the driving force for running the vehicle in response to a shifting operation can be improved, and the energy efficiency can be improved through shifting operations.

A second aspect of the invention is concerned with a method of controlling a vehicle including an electric motor that delivers power to a drive shaft coupled to driving wheels, an electric storage device that supplies and receives electric power to and from the electric motor, an accelerator operation amount obtaining device that obtains an accelerator operation amount as an amount of operation of an accelerator pedal by a driver, a vehicle speed obtaining device that obtains a vehicle speed, and a gear range selecting device that permits the driver to select a desired gear range from a normal running range and a plurality of virtual gear ranges. According to the control method, when one of the virtual gear ranges is selected by the driver, extracting a restriction corresponding to the virtual gear range selected by the driver, from a plurality of restrictions that are created for the respective virtual gear ranges, such that, in each of said plurality of virtual gear ranges, required driving force as driving force to be applied to the drive shaft, which corresponds to the same accelerator operation amount, tends to be increased as the vehicle speed is higher, and the required driving force corresponding to the same accelerator operation amount tends to be increased as the virtual gear range is shifted to a lower range when the vehicle speed is constant, and setting the required driving force corresponding to the accelerator operation amount obtained by the accelerator operation amount obtaining device and the vehicle speed obtained by the vehicle speed obtaining device, using the extracted restriction. The electric motor is controlled so that power based on the set required driving force is delivered to the drive shaft.

According to the above aspect of the invention, the output characteristic of the driving force for running the vehicle in response to a shifting operation can be improved, and the energy efficiency can be improved through shifting operations.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is an explanatory view showing a map for setting a controlled accelerator pedal stroke in a normal mode, a map for setting the controlled accelerator pedal stroke in a power mode, and a map for setting the controlled accelerator pedal stroke in an ECO mode;

DETAILED DESCRIPTION OF EMBODIMENTS

One mode for carrying out the invention will be described as an embodiment of the invention.

Figure 1:
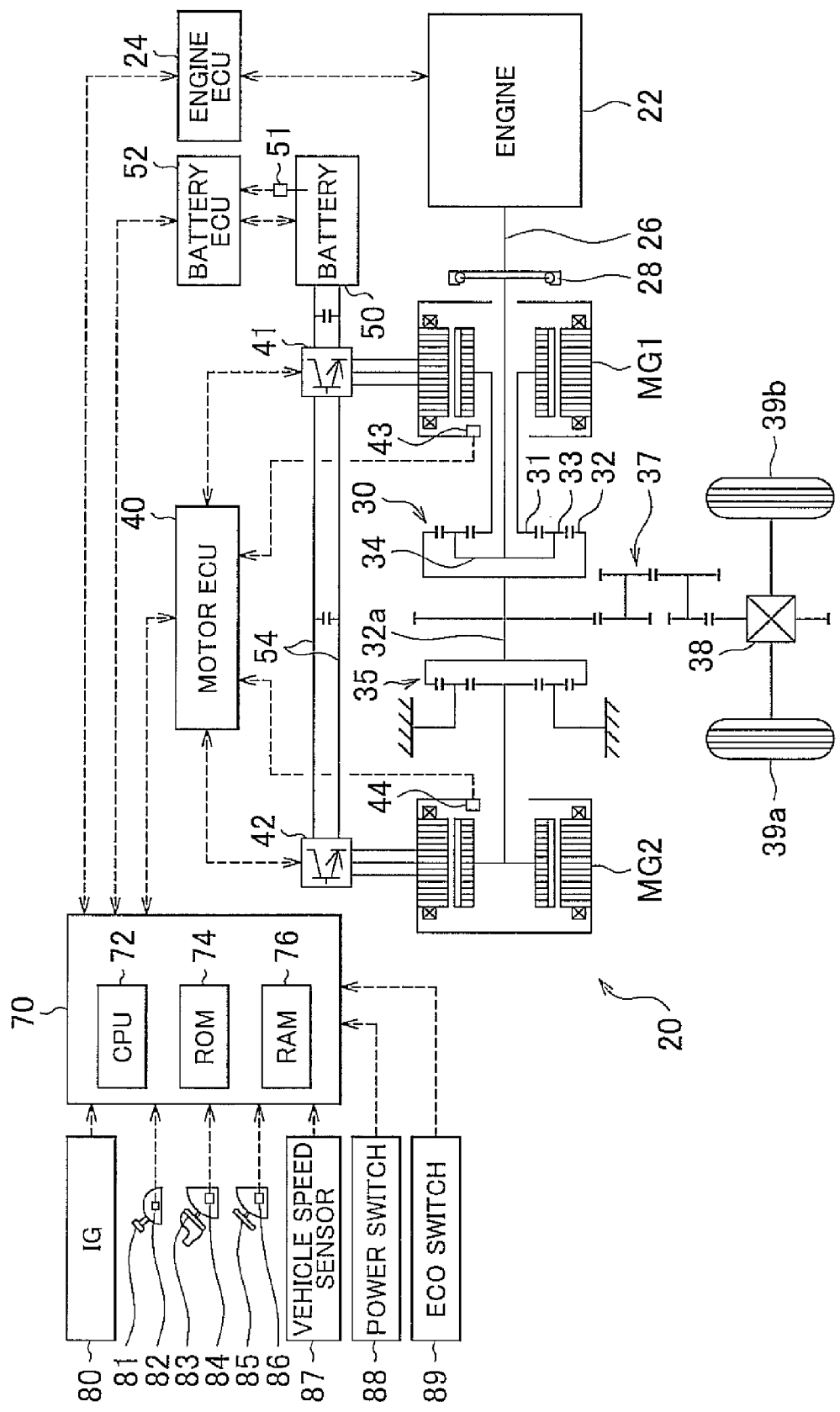
FIG. 1 is a schematic view showing the construction of a hybrid vehicle as a vehicle according to one embodiment of the invention.

FIG. 1 is a schematic view showing the construction of a hybrid vehicle 20 as a vehicle according to the embodiment of the invention. The hybrid vehicle 20 shown in FIG. 1 includes an engine 22, a three-shaft-type power distribution and integration mechanism 30 connected to a crankshaft 26 as an output shaft of the engine 22 via a damper 28, a motor MG1 connected to the power distribution and integration mechanism 30 and capable of generating electric power, a reduction gear 35 coupled to a ring gear shaft 32a as a drive shaft connected to the power distribution and integration mechanism 30, a motor MG2 connected to the ring gear shaft 32a via the reduction gear 35, a battery 50 capable of supplying and receiving electric power to and from the motors MG1 and MG2, an electronic control unit for hybrid vehicles (hereinafter called "hybrid ECU") 70 that controls the overall system of the hybrid vehicle 20, and so forth.

The engine 22 is an internal combustion engine that generates power with a hydrocarbon fuel, such as gasoline or light oil, supplied thereto, and an electronic control unit for engines (hereinafter called "engine ECU") 24 controls the engine 22 in terms of the fuel injection amount, the ignition timing, the intake air quantity or airflow, and so forth. The engine ECU 24 receives signals from various sensors provided on the engine 22 for detecting operating conditions of the engine 22. The engine ECU 24, which communicates with the hybrid ECU 70, controls the operation of the engine 22 based on a control signal from the hybrid ECU 70, signals from the above-indicated sensors, etc., and transmits data concerning the operating conditions of the engine 22 to the hybrid ECU 70 as needed.

The power distribution and integration mechanism 30 has a sun gear 31 in the form of an external gear, a ring gear 32 in the form of an internal gear disposed concentrically with the sun gear 31, a plurality of pinion gears 33 that mesh with the sun gear 31 and also mesh with the ring gear 32, and a carrier 34 that holds the pinion gears 33 such that the pinion gears 33 can rotate about themselves and about the same axis. Thus, the power distribution and integration mechanism 30 is a single-pinion type planetary gear mechanism arranged to allow the three elements (i.e., the sun gear 31, ring gear 32 and the carrier 34) to rotate in a differential manner. The crankshaft 26 of the engine 22 is coupled to the carrier 34 as a first element of the power distribution and integration mechanism 30, and a rotating shaft of the motor MG1 is coupled to the sun gear 31 as a second element, while a rotating shaft of the motor MG2 is coupled to the ring gear 32 as a third element via the ring gear shaft 32a as the drive shaft and the reduction gear 35. When the motor MG1 functions as a generator, the power distribution and integration mechanism 30 distributes the power received from the engine 22 via the carrier 34, to the sun gear 31 side and the ring gear 32 side, according to the gear ratio thereof. When the motor MG1 functions as a motor, the power distribution and integration mechanism 30 integrates the power received from the engine 22 via the carrier 34 and the power received from the motor MG1 via the sun gear 31, and delivers the integrated power to the ring gear 32 side. The power delivered to the ring gear 32 is transmitted from the ring gear shaft 32a finally to wheels 39a, 39b as driving wheels, via a gear mechanism 37 and a differential gear 38.

The motors MG1 and MG2 are both constructed as synchronous generator-motors each capable of operating as a generator and also operating as a motor. In operation, the motors MG1, MG2 supply and receive electric power to and from the battery 50 as a secondary battery via inverters 41, 42. A power line 54 that connects the inverters 41, 42 with the battery 50 consists of a positive bus and a negative bus, which are shared by the inverters 41, 42, and permits electric power generated by one of the motors MG1, MG2 to be consumed by the other motor. Accordingly, the battery 50 is charged with electric power generated by either of the motors MG1, MG2, or is discharged to make up for a shortage of electric power, and the battery 50 is not charged nor discharged if there is a balance in the amount of electric power between the motor MG1 and the motor MG2. The motors MG1, MG2 are both controlled by an electronic control unit for motors (hereinafter called "motor ECU") 40. The motor ECU 40 receives signals necessary to control driving of the motors MG1, MG2, for example, signals from rotational position detection sensors 43, 44 that detect the rotational positions of rotors of the motors MG1, MG2, and phase currents applied to the motors MG1, MG2 and detected by current sensors (not shown). From the motor ECU 40 are generated switching control signals to the inverters 41, 42, and other signals. Also, the motor ECU 40 executes a rotational speed calculation routine (not shown) based on the signals received from the rotational position detection sensors 43, 44, so as to calculate the rotational speeds Nm1, Nm2 of the rotors of the motors MG1, MG2. Further, the motor ECU 40, which communicates with the hybrid ECU 70, controls driving of the motors MG1, MG2 based on a control signal from the hybrid ECU 70, for example, and transmits data concerning operating conditions of the motors MG1, MG2 to the hybrid ECU 70 as needed.

The battery 50 is in the form of a lithium-ion secondary battery or a nickel metal hydride secondary battery, and is managed by an electronic control unit for batteries (hereinafter called "battery ECU") 52. The battery ECU 52 receives signals necessary to manage the battery 50, for example, a terminal voltage from a voltage sensor (not shown) installed between terminals of the battery 50, a charge/discharge current from a current sensor (not shown) mounted to the power line 54 connected to the output terminal of the battery 50, a battery temperature Tb from a temperature sensor 51 mounted to the battery 50, and so forth. The battery ECU 52 transmits data concerning conditions of the battery 50 by communications to the hybrid ECU 70 as needed. In order to manage the battery 50, the battery ECU 52 also calculates the state of charge (or remaining capacity) SOC based on the integrated value of charge/discharge currents detected by the current sensor, and calculates the required power Pb* for charge or discharge of the battery 50, based on the state of charge SOC. Also, the battery ECU 52 calculates the input limit Win as allowable charging power that is electric power with which the battery 50 is allowed to be charged, and the output limit Wout as allowable discharge power that is electric power allowed to be discharged from the battery 50, based on the state of charge SOC and the battery temperature Tb. The input and output limits Win, Wout of the battery 50 may be set as follows: initially, basic values of the input and output limits Win, Wout are set based on the battery temperature Tb, while a correction factor for the output limit and a correction coefficient for the input limit are set based on the state of charge SOC of the battery 50, and the input and output limits Win, Wout are set by multiplying the thus set basic values of the input and output limits Win, Wout by the corresponding correction factors.

The hybrid ECU 70 consists of a microprocessor having CPU 72 as a main component, and includes ROM 74 that stores programs, RAM 76 that temporarily stores data, input and output ports and communication port (not shown), etc., in addition to the CPU 72. The hybrid ECU 70 is connected with the engine ECU 24, motor ECU 40, battery ECU 52, etc. via the communication port, and sends and receives various control signals and data to and from the engine ECU 24, motor ECU 40, battery ECU 52, etc. Also, the hybrid ECU 70 receives an ignition signal from an ignition switch (start switch) 80, a gear range SR from a gear range sensor 82 that detects the gear range SR corresponding to the currently selected position (shift position) of a shift lever 81, an accelerator pedal stroke Acc from an accelerator pedal position sensor 84 that detects the amount of depression of an accelerator pedal 83, a brake pedal stroke BS from a brake pedal stroke sensor 86 that detects the amount of depression of a brake pedal 85, a vehicle speed V from a vehicle speed sensor 87, and so forth, via the input port. In this embodiment, a power switch (operating mode selecting means) 88 is provided in the vicinity of the driver's seat of the hybrid vehicle 20, for selecting a power mode (second operating mode) in which the power performance, i.e., the responsiveness of torque output to an operation on the accelerator pedal, is prioritized, as an operating mode. The power switch 88 is also connected to the hybrid ECU 70. In addition, an ECO switch (operating mode selecting means) 89 is provided in the vicinity of the driver's seat of the hybrid vehicle 20, for selecting an ECO mode (third operating mode) in which the fuel efficiency of the engine 22 and the energy efficiency are prioritized, as an operating mode. The ECO switch 89 is also connected to the hybrid vehicle 70.

In the hybrid vehicle 20 of this embodiment, the shift positions of the shift lever 81 include a P position corresponding to a parking range selected when the vehicle is to be parked, R position corresponding to a reverse range for reverse running, N position corresponding to a neutral range, and a D position corresponding to a drive range (D range) for nominal forward running. In addition to these positions, a sequential shift position (S position), upshift command position and a downshift command position are prepared as shift positions of the shift lever 81. The sequential shift position (S position) corresponds to a sequential gear range (S range) that enables the driver to select a certain virtual gear range from a plurality of virtual gear ranges SR1, SR2, SR3, SR4, SR5 and SR6. If the driver operates the shift lever 81 to the S position, one of the virtual gear ranges SR1-SR6 which is selected according to the vehicle speed V, etc. is set as the initial range. Then, the virtual gear range is shifted up by one step at a time if the shift lever 81 is operated to the upshift command position, while the virtual gear range is shifted down by one step at a time if the shift lever 81 is operated to the downshift command position. The gear range sensor 82 outputs the currently selected one of the virtual gear ranges SR1-SR6, as the gear range SR, according to the operation performed on the shift lever 81.

During running of the hybrid vehicle 20 of this embodiment constructed as described above, the hybrid ECU 70 sets a controlled accelerator pedal stroke Acc*, based on the accelerator pedal stroke Acc corresponding to the amount of depression of the accelerator pedal 83 by the driver. The hybrid ECU 70 also sets the required torque Tr* to be applied to the ring gear shaft 32$a$ as the drive shaft coupled to the wheels 39$a$, 39$b$ as driving wheels, based on the controlled accelerator pedal stroke Acc* and the vehicle speed V, and controls the engine 22, motor MG1 and motor MG2 so that torque based on the required torque Tr* is applied to the ring gear shaft 32$a$. Operation control modes of the engine 22, motor MG1 and motor MG2 include, for example, a torque conversion operating mode, a charge/discharge operating mode, and a motor operating mode. In the torque conversion operating mode, the operation of the engine 22 is controlled so that power commensurate with or equivalent to the required torque Tr* is generated from the engine 22, and the motor MG1 and the motor MG2 are controlled so that the entire power generated from the engine 22 is converted into torque by means of the power distribution and integration mechanism 30, motor MG1 and motor MG2, and is delivered to the ring gear shaft 32$a$. In the charge/discharge operating mode, the operation of the engine 22 is controlled so that power commensurate with or equivalent to the sum of the required torque Tr* and electric power required for charge/discharge of the battery 50 is generated from the engine, and the motor MG1 and the motor MG2 are controlled so that torque based on the required torque Tr* is applied to the ring gear shaft 32$a$ with the whole or a part of the power generated from the engine 22 along with charge or discharge of the battery 50 being converted into torque by means of the power distribution and integration mechanism 30, motor MG1 and motor MG2. In the motor operating mode, the operation of the engine 22 is stopped, and the motor MG2 is controlled so that torque based on the required torque Tr* is applied to the ring gear shaft 32$a$. In the hybrid vehicle 20 of this embodiment, when certain conditions are satisfied in the torque conversion operating mode or charge/discharge operating mode, an intermittent operation of the engine 22 in which the engine 22 is automatically stopped and started is carried out.

When both of the power switch 88 and the ECO switch 89 are placed in the OFF positions in the hybrid vehicle 20 of this embodiment, a normal mode (first operating mode) is selected as the operating mode. In this condition, the hybrid ECU 70 sets a power-mode flag Fpwr to value 0, and controls the hybrid vehicle 20 according to various control procedures used when the normal mode is selected. In this embodiment, if the accelerator pedal 83 is depressed in a condition where the D range is selected as the gear range SR and the normal mode is selected as the operating mode, the controlled accelerator pedal stroke Acc* is set based on the accelerator pedal stroke Acc detected by the accelerator pedal position sensor 84 and a map used for setting the controlled accelerator pedal stroke in the normal mode, and the required torque Tr* to be applied to the ring gear shaft 32$a$ as the drive shaft is set based on the controlled accelerator pedal stroke Acc* and the vehicle speed V. The map for setting the controlled accelerator pedal stroke in the normal mode is created in advance and stored in the ROM 74, as indicated by the alternate long and short dashed line in FIG. 2, such that the controlled accelerator pedal stroke Acc* has a linear relationship with the accelerator pedal stroke Acc over the range of 0 to 100%, namely, the accelerator pedal stroke Acc is set as it is as the controlled accelerator pedal stroke Acc*.

When the power switch 88 is turned on, and the power mode is selected as the operating mode of the hybrid vehicle 20, the hybrid ECU 70 sets the above-mentioned power-mode flag Fpwr to value 1, and controls the hybrid vehicle 20 according to various control procedures used when the power mode is selected. In this embodiment, if the accelerator pedal 83 is depressed in a condition where the D range is selected as the gear range SR and the power mode is selected as the operating mode, the controlled accelerator pedal stroke Acc* is set based on the accelerator pedal stroke Acc detected by the accelerator pedal position sensor 84 and a map (restriction on increase of operation amount) used for setting the controlled accelerator pedal stroke in the power mode, and the required torque Tr* to be applied to the ring gear shaft 32$a$ as the drive shaft is set based on the controlled accelerator pedal stroke Acc* and the vehicle speed V. The map used in this embodiment for setting the controlled accelerator pedal stroke in the power mode, which is a non-linear map as indicated by the solid line in FIG. 2, is created in advance and stored in the ROM 74. In this map, the controlled accelerator pedal stroke Acc* is set to the same value as that set in the map for setting the controlled accelerator pedal stroke in the normal mode, with respect to the accelerator pedal stroke Acc that falls within a certain small-acceleration-stroke region, so that the driver is less likely to feel as if the vehicle were abruptly accelerated or driven forward when it runs at a low vehicle speed. The map is also plotted such that the controlled accelerator pedal stroke Acc* is set to a larger value than that set in the map for setting the controlled accelerator pedal stroke in the normal mode, with respect to the accelerator pedal stroke Acc that falls within a range up to 100% excluding the small-acceleration-stroke region, so as to improve the responsiveness of the torque output to the operation on the accelerator pedal. Thus, when the power mode is selected by the driver, the engine 22 and the motors MG1 and MG2 are controlled so that the torque applied to the ring gear shaft 32$a$ is increased to be larger than the torque applied thereto when the normal mode is selected, whereby the responsiveness of the torque output to the driver's operation on the accelerator pedal can be improved.

When the ECO switch 89 is turned on, and the ECO mode is selected as the operating mode of the hybrid vehicle 20, the hybrid ECU 70 sets an ECO-mode flag Feco to value 1, and controls the hybrid vehicle 20 according to predetermined, various control procedures used when the ECO mode is selected. In this embodiment, if the accelerator pedal 83 is depressed in a condition where the D range is selected as the gear range SR and the ECO mode is selected as the operating mode, the controlled accelerator pedal stroke Acc* is set based on the accelerator pedal stroke Acc detected by the accelerator pedal position sensor 84 and a map (restriction on reduction of operation amount) used for setting the controlled accelerator pedal stroke in the ECO mode, and the required torque Tr* to be applied to the ring gear shaft 32$a$ as the drive shaft is set based on the controlled accelerator pedal stroke Acc* and the vehicle speed V. The map used in this embodiment for setting the controlled accelerator pedal stroke in the ECO mode, which is a non-linear map as indicated by the dashed line in FIG. 2, is created and stored in the ROM 74, such that the controlled accelerator pedal stroke Acc* is set to a smaller value than that set in the map for setting the controlled accelerator pedal stroke in the normal mode, so as to reduce the responsiveness of the torque output to the driver's operation on the accelerator pedal. Thus, when the ECO mode is selected by the driver, the engine 22 and the motors MG1 and MG2 are controlled so that the torque applied to the ring gear shaft 32a as the drive shaft is reduced to be smaller than the torque applied thereto when the normal mode is selected, whereby the fuel consumption rate or efficiency of the engine 22 and the electric power consumed by the motor MG2 are reduced, for improvement of the energy efficiency.

Figure 3A:
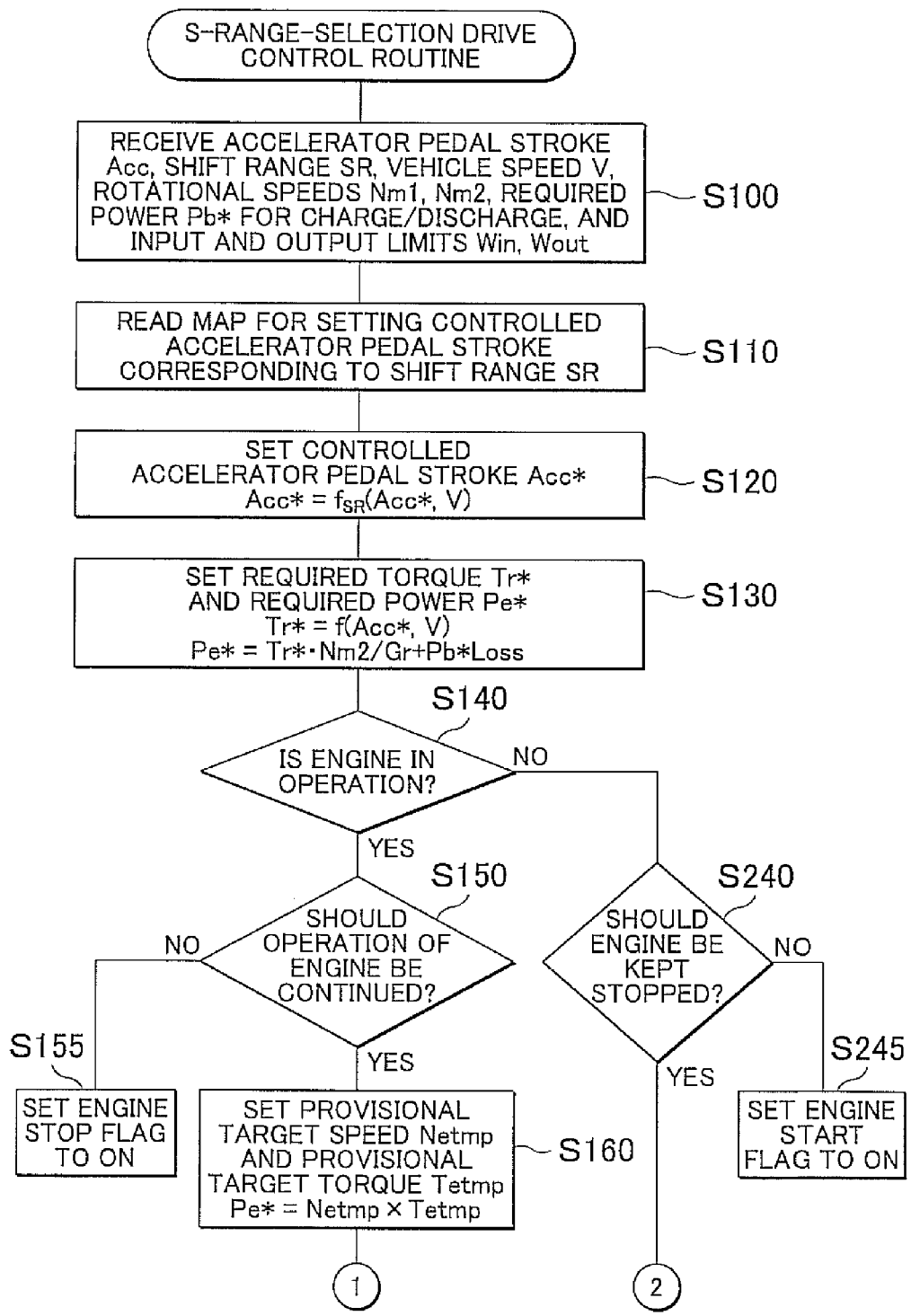
FIG. 3 is a flowchart illustrating one example of S-range-selection drive control routine executed by a hybrid ECU of the embodiment of FIG. 1 when a sequential gear range is selected.
Figure 3B:
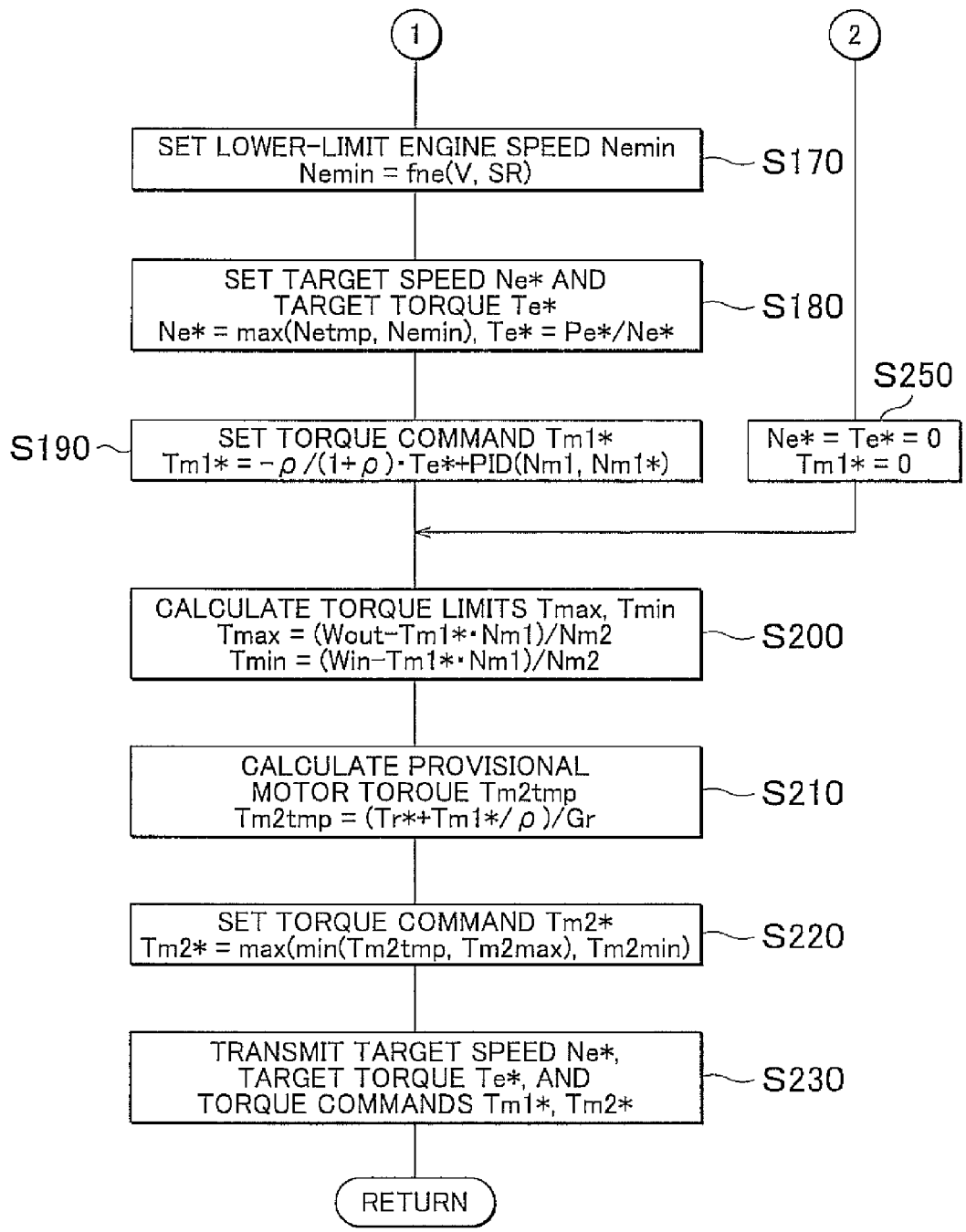

Next, the operation of the hybrid vehicle 20 of this embodiment, in particular, the operation of the hybrid vehicle 20 when it is running while the sequential gear range (S range) is selected by the driver, will be described. FIG. 3 is a flowchart illustrating one example of S-range-selection drive control routine that is executed at given time intervals (e.g., every several milliseconds) by the hybrid ECU 70 of this embodiment when the accelerator pedal 83 is depressed by the driver in a condition where the S range is selected.

Upon the start of the S-range-selection drive control routine of FIG. 3, the CPU 72 of the hybrid ECU 70 performs input processing to receive data necessary for control, such as the accelerator pedal stroke Acc from the accelerator pedal position sensor 84, the gear range SR from the gear range sensor 82, the vehicle speed V from the vehicle speed sensor 87, the rotational speeds Nm1, Nm2 of the motors MG1, MG2, the required power Pb* for charge or discharge of the battery 50, and the input and output limits Win, Wout (step S100). The CPU 72 receives the rotational speeds Nm1, Nm2 of the motors MG1, MG2 from the motor ECU 40 by communications, and receives the required power Pb* for charge/discharge of the battery 50 and the input and output limits Win, Wout from the battery ECU 52 by communications. After the data input processing of step S100, the CPU 72 of the hybrid ECU 70 reads a map for setting the controlled accelerator pedal stroke corresponding to the received gear range SR, i.e., the virtual gear range selected by the driver, from the ROM 74 (step S110).

In the hybrid vehicle 20 of this embodiment, a plurality of maps for setting the controlled accelerator pedal stroke Acc*, which are associated with the virtual gear ranges SR1-SR6, respectively, and each of which defines relationships among the accelerator pedal stroke Acc, vehicle speed V and the controlled accelerator pedal stroke Acc*, are created in advance and stored in the ROM 74. In this embodiment, the plurality of maps for setting the controlled accelerator pedal stroke are prepared for the respective virtual gear ranges SR1-SR6, such that the required torque Tr* (required driving force) corresponding to the same accelerator pedal stroke Acc (the amount of operation of the accelerator pedal) tends to increase as the vehicle speed V is higher, and such that the required torque Tr* corresponding to the same accelerator pedal stroke Acc tends to increase as the virtual gear range is shifted to a lower range while the vehicle speed V is constant.

In this embodiment, the plurality of maps for setting the controlled accelerator pedal stroke, which correspond to the respective virtual gear ranges SR1-SR6, are created based on the above-described map for setting the controlled accelerator pedal stroke in the power mode and the map for setting the controlled accelerator pedal stroke in the ECO mode. A map for setting the controlled accelerator pedal stroke corresponding to a relatively low virtual gear range is created, for example, by matching a correlation curve indicating the relationship between the accelerator pedal stroke Acc and the controlled accelerator pedal stroke Acc* at the practically highest vehicle speed in the virtual gear range in question with a correlation curve indicating the relationship between the accelerator pedal stroke Acc and the controlled accelerator pedal stroke Acc* in the map for setting the controlled accelerator pedal stroke in the power mode, and making the correlation curve indicating the relationship between the accelerator pedal stroke Acc and the controlled accelerator pedal stroke Acc* closer to the straight line (see the alternate long and short dashed line in FIG. 2) in the map for setting the controlled accelerator pedal stroke in the normal mode as the vehicle speed V is lower, based on the results of experiment and analysis. A map for setting the controlled accelerator pedal stroke corresponding to a relatively high virtual gear range is created, for example, by matching a correlation curve indicating the relationship between the accelerator pedal stroke Acc and the controlled accelerator pedal stroke Acc* at the practically lowest vehicle speed in the virtual gear range in question with a correlation curve indicating the relationship between the accelerator pedal stroke Acc and the controlled accelerator pedal stroke Acc* in the map for setting the controlled accelerator pedal stroke in the ECO mode, and making the correlation curve indicating the relationship between the accelerator pedal stroke Acc and the controlled accelerator pedal stroke Acc* closer to the straight line (see the alternate long and short dashed line in FIG. 2) in the map for setting the controlled accelerator pedal stroke in the normal mode as the vehicle speed V is higher, based on the results of experiment and analysis.

Figure 4:
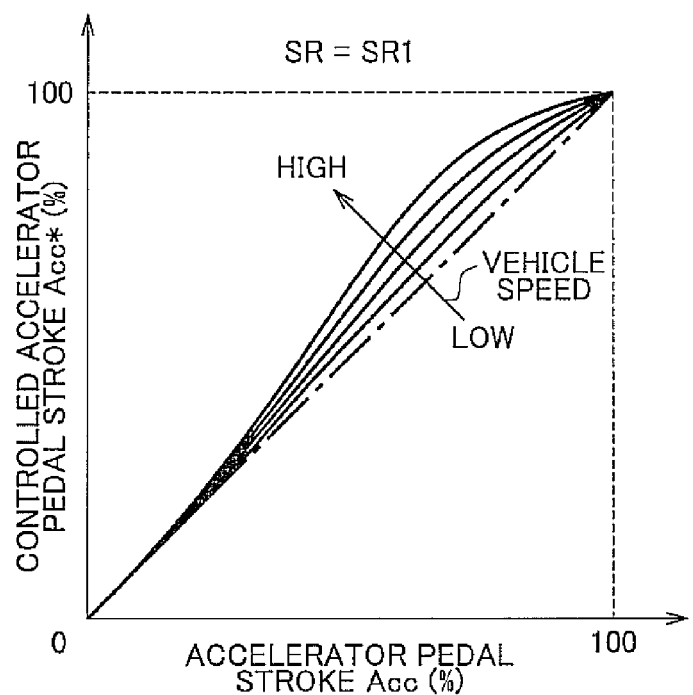
FIG. 4 is an explanatory view showing one example of maps for setting the controlled accelerator pedal stroke corresponding to virtual gear ranges SR1-SR6.
Figure 5:
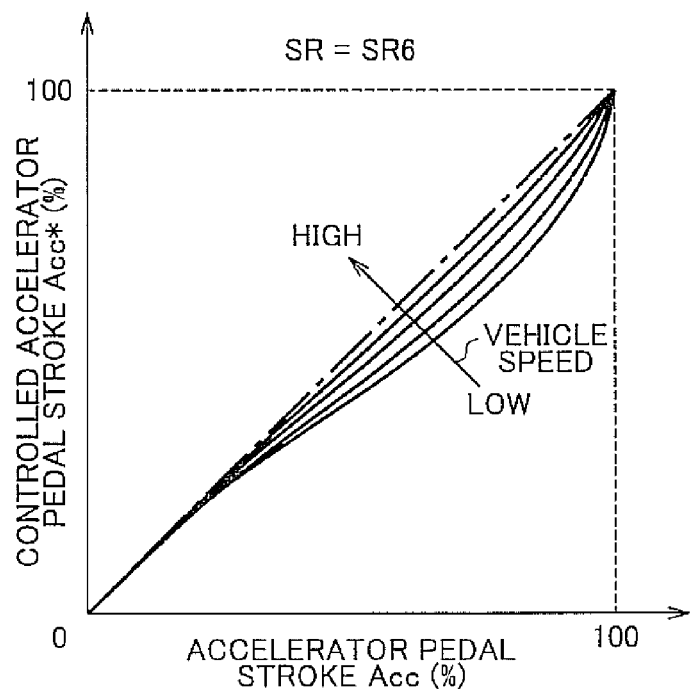
FIG. 5 is an explanatory view showing another example of maps for setting the controlled accelerator pedal stroke corresponding to virtual gear ranges SR1-SR6.
Figure 6:
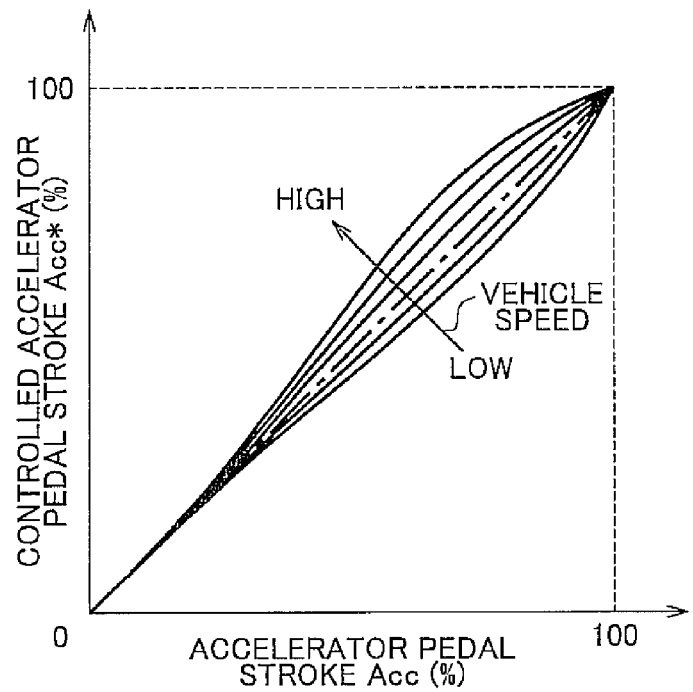
FIG. 6 is an explanatory view showing a further example of maps for setting the controlled accelerator pedal stroke corresponding to virtual gear ranges SR1-SR6.

Thus, the map for setting the controlled accelerator pedal stroke corresponding to the lowest virtual gear range SR1, for example, as one of the maps for setting the controlled accelerator pedal stroke corresponding to the virtual gear ranges SR1-SR6, is plotted as shown in FIG. 4, such that the controlled accelerator pedal stroke Acc* corresponding to the accelerator pedal stroke Acc received from the accelerator pedal position sensor 84 is set non-linearly with respect to and larger than the accelerator pedal stroke Acc in question as the vehicle speed V is higher, and the accelerator pedal stroke Acc tends to be substantially converted into a larger value than the actual value as the vehicle speed V is higher. Also, in this embodiment, the map for setting the controlled accelerator pedal stroke corresponding to the highest virtual gear range SR6, for example, is plotted as shown in FIG. 5, such that the controlled accelerator pedal stroke Acc* corresponding to the accelerator pedal stroke Acc received from the accelerator pedal position sensor 84 is set non-linearly with respect to and smaller than the accelerator pedal stroke Acc in question as the vehicle speed V is lower, and the accelerator pedal stroke Acc tends to be substantially converted into a smaller value than the actual value as the vehicle speed V is lower. Also, the map for setting the controlled accelerator pedal stroke corresponding to the middle virtual gear range SR4, for example, is plotted as shown in FIG. 6, such that, in a relatively high vehicle-speed region, the controlled accelerator pedal stroke Acc* corresponding to the accelerator pedal stroke Acc received from the accelerator pedal position sensor 84 is set non-linearly with respect to and larger than the accelerator pedal stroke Acc as the vehicle speed V is higher, and, in a relatively low vehicle-speed region, the controlled accelerator pedal stroke Acc* corresponding to the accelerator pedal stroke Acc received from the accelerator pedal position sensor 84 is set non-linearly with respect to and smaller than the accelerator pedal stroke Acc as the vehicle speed V is lower.

Referring back to FIG. 3, after the map for setting the controlled accelerator pedal stroke corresponding to the gear range SR, i.e., the virtual gear range selected by the driver, is read in step S110, the CPU 72 of the hybrid ECU 70 derives and sets the controlled accelerator pedal stroke Acc* corresponding to the accelerator pedal stroke Acc and vehicle speed V received in step S100, from the map for setting the controlled accelerator pedal stroke read in step S110 (step S120). Then, the CPU 72 of the hybrid ECU 70 sets the required torque Tr* to be applied to the ring gear shaft 32a based on the vehicle speed V received in step S100 and the controlled accelerator pedal stroke Acc* set in step S120, so as to set the required power Pe* that is required to be generated by the vehicle as a whole (step S130).

Figure 7:
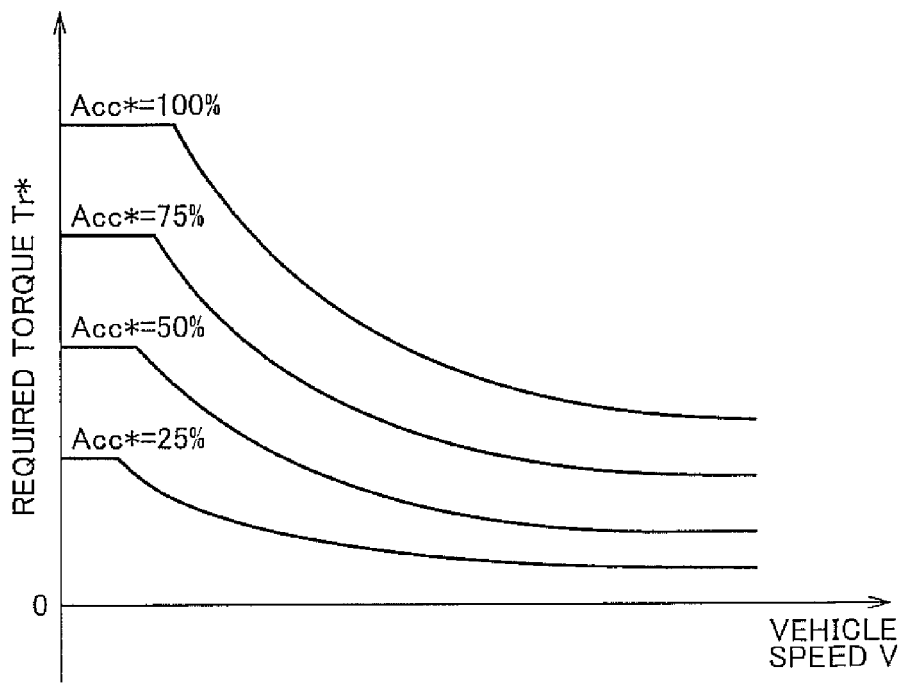
FIG. 7 is an explanatory view showing one example of map for setting the required torque.

In this embodiment, the relationships among the controlled accelerator pedal stroke Acc*, vehicle speed V and the required torque Tr* are predetermined and stored in the ROM 74 as a map for setting the required torque as shown in FIG. 7 by way of example. The required torque Tr* corresponding to the controlled accelerator pedal stroke Acc* and the vehicle speed V is derived from this map and set. Thus, no matter which of the virtual gear ranges SR1-SR6 is selected, the required torque Tr* corresponding to the same accelerator pedal stroke Acc is set to be larger as the vehicle speed V is higher. Where the vehicle speed V is constant, the required torque Tr* corresponding to the same accelerator pedal stroke Acc is set to be larger as the lower one of the virtual gear ranges SR1-SR6 is selected as the gear range SR. Also, in this embodiment, the required power Pe* is calculated as the sum of the product of the required torque Tr* and the rotational speed Nr of the ring gear shaft 32a, the required power Pb* for charge or discharge, and a loss Loss. The rotational speed Nr of the ring gear shaft 32a may be obtained by dividing the rotational speed Nm2 of the motor MG2 by the gear ratio Gr of the reduction gear 35 as indicated in FIG. 3, or by multiplying the vehicle speed V by a conversion factor k.

Referring back to FIG. 3, the CPU 72 of the hybrid ECU 70 determines whether the engine 22 is in operation (step S140). If the engine 22 is in operation, the CPU 72 determines whether the operation of the engine 22 should be continued (step S150). In step S150, it is determined that the operation of the engine 22 should be continued if any one of conditions for inhibiting intermittent operation, such as conditions that the vehicle speed V is equal to or higher than a given vehicle speed set for inhibition of intermittent operation, and that the required power Pe* is equal to or larger than a given engine-stop threshold value. If it is determined in step S150 that the operation of the engine 22 should not be continued, a certain engine stop flag is set to ON (step S155), and the routine of FIG. 3 ends. If the engine stop flag is set to ON, an engine stop control routine (not shown) is executed by the hybrid ECU 70. The processing according to the engine stop control routine is as follows: in a condition where supply of fuel to the engine 22 is being stopped, a negative torque for controlling (i.e., slowing down) the rotation of the engine 22 until the rotational speed Ne of the engine 22 reaches a given prior-to-stop speed to be achieved immediately before stop of the engine is set as a torque command Tm1* issued to the motor MG1, and a positive torque for holding the piston at the time when the rotational speed Ne reaches the given prior-to-stop speed is set as the torque command Tm1* issued to the motor MG1, while a torque command Tm2* issued to the motor MG2 is set so that torque based on the required torque Tr* is applied to the ring gear shaft 32a. If the engine stop control routine ends, the engine stop flag is set to OFF.

Figure 8:
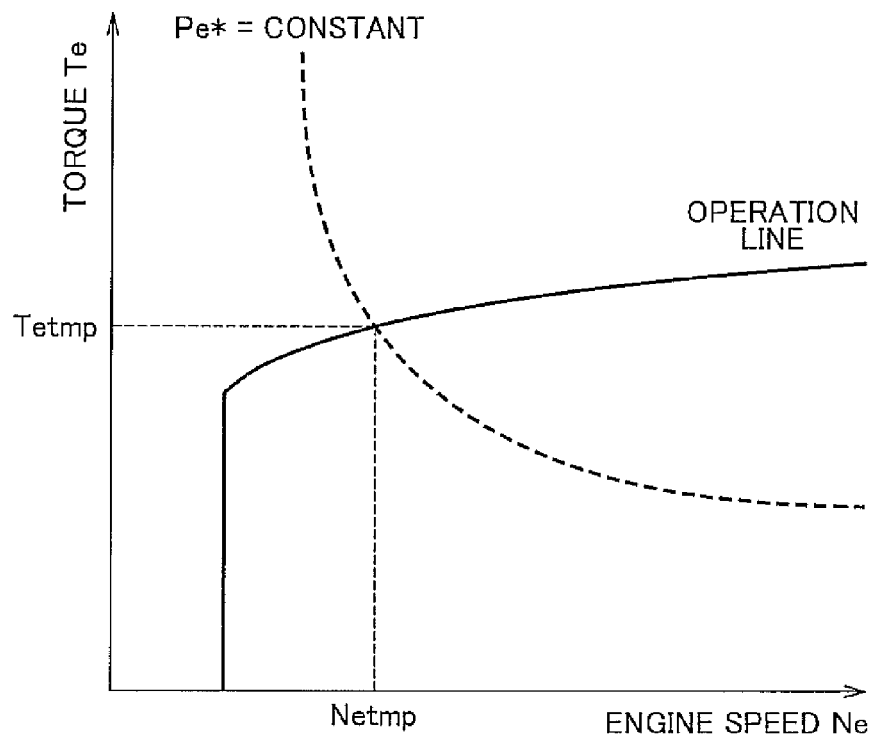
FIG. 8 is an explanatory view showing an operation line of an engine and a curve indicative of the relationship between the engine speed and the torque.

When it is determined in step S150 that the operation of the engine 22 should be continued, the CPU 72 of the hybrid ECU 70 sets a provisional target rotational speed Netmp and a provisional target torque Tetmp as provisional target operating points of the engine 22, based on the required power Pe* (step S160). In this embodiment, the provisional target speed Netmp and provisional target torque Tetmp of the engine 22 are set based on an operation line determined in advance so as to operate the engine 22 with high efficiency, and the required power Pe*. FIG. 8 shows the operation line of the engine 22 and a correlation curve indicating the relationship between the engine speed Ne and the torque Te. As shown in FIG. 8, the provisional target speed Netmp and the provisional target torque Tetmp can be obtained as an intersection point of the operation line and the correlation curve indicating that the required power Pe* (Ne×Te) is constant.

Figure 9:
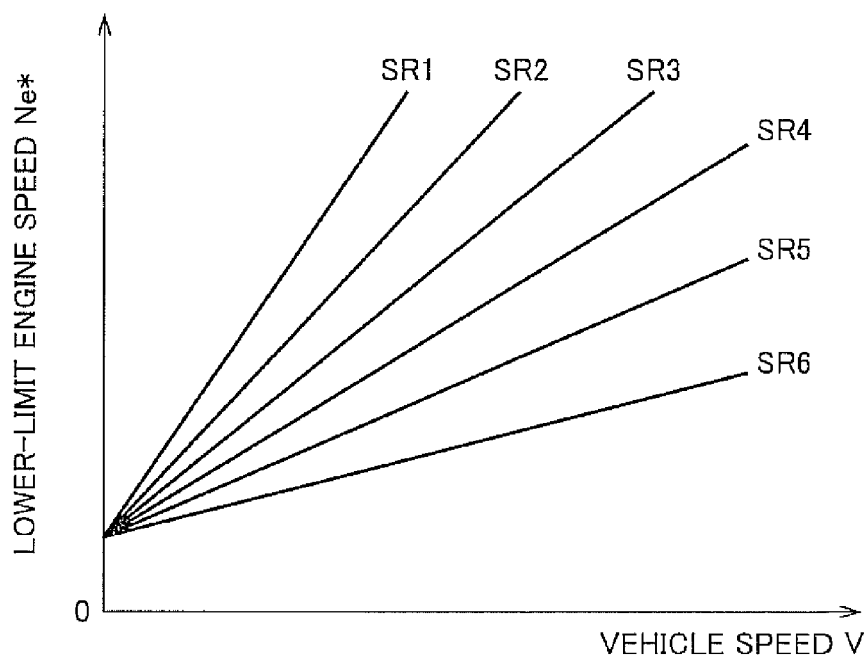
FIG. 9 is an explanatory view showing one example of map for setting the lower-limit engine speed.

Referring back to FIG. 3, after the provisional target speed Netmp and provisional target torque Tetmp of the engine 22 are set, the CPU 72 of the hybrid ECU 70 sets a lower-limit engine speed Nemin as the lower limit of the rotational speed Ne of the engine 22, based on the vehicle speed V and gear range SR (virtual gear range) received in step S100 (step S170). In this embodiment, the lower-limit engine speed Nemin is determined according to the vehicle speed V and the gear range SR (SR1-SR6) when the S range is selected, and the lower-limit engine speed Nemin is set to a smaller value as the speed or gear position of the gear range SR increases (as the gear range SR is shifted from SR1 to SR6) with respect to the same vehicle speed V. In this embodiment, the relationships among the vehicle speed V, gear range SR and the lower-limit engine speed Nemin are determined in advance and stored in the ROM 74 as a map for setting the lower-limit engine speed as shown in FIG. 9 by way of example. The lower-limit engine speed Nemin corresponding to the received vehicle speed V and gear range SR is derived from this map and set. Thus, when the accelerator pedal 83 is depressed while one of the virtual gear ranges SR1-SR6 is selected by the driver, the rotational speed Ne of the engine 22 is kept high to some extent, and the output response of the engine 22 can be ensured. If the lower-limit engine speed Nemin is set in step S170, the CPU 72 of the hybrid ECU 70 sets the larger one of the provisional target speed Netmp and the lower-limit engine speed Nemin as a target speed Ne* of the engine 22, and sets a target torque Te* of the engine 22 by dividing the required power Pe* set in step S130 by the target speed Ne* (step S180).

After the operation of step S180, the CPU 72 of the hybrid ECU 70 calculates a target rotational speed Nm1* of the motor MG1 according to the following equation (1), using the target engine speed Ne*, the rotational speed Nr (Nm2/Gr) of the ring gear shaft 32a, and the gear ratio ρ (the number of teeth of the sun gear 31/the number of teeth of the ring gear 32) of the power distribution and integration mechanism 30, and then sets the torque command Tm1* to be issued to the motor MG1 according to the following equation (2), using the target torque Te*, the calculated target rotational speed Nm1*, the current rotational speed Nm1, and so forth. (step S190).

$$Nm1^* = Ne^* \cdot (1+\rho)/\rho - Nm2/(Gr \cdot \rho) \qquad (1)$$

$$Tm1^* = -\rho/(1+\rho) \cdot Te^* + k1 \cdot (Nm1^* - Nm1) + k2 \cdot \int (Nm1^* - Nm1) dt \qquad (2)$$

Figure 10:
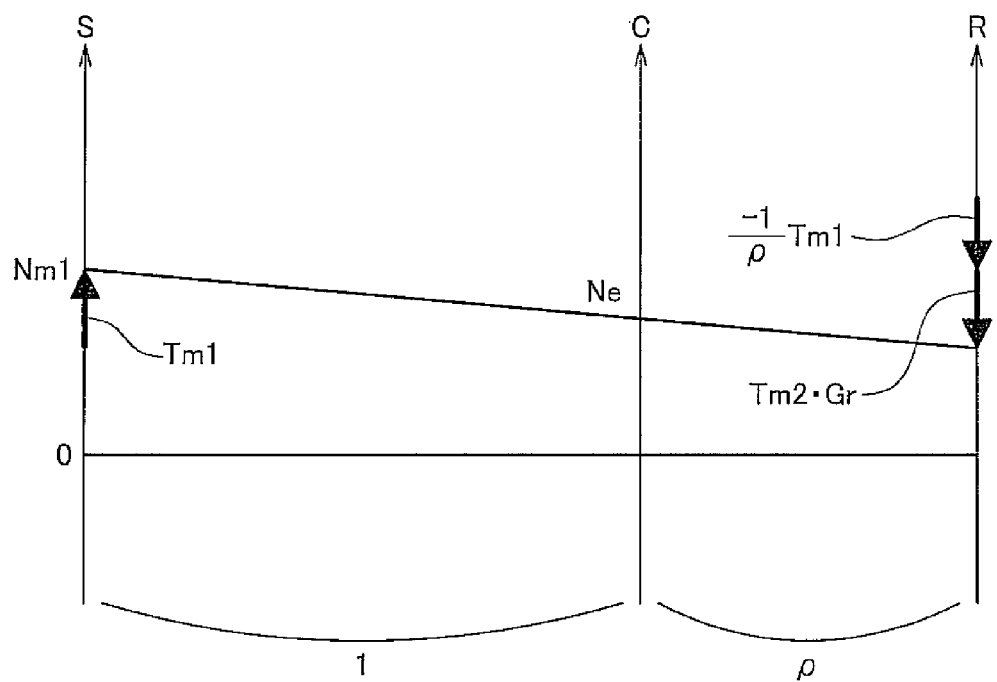
FIG. 10 is an explanatory view showing one example of alignment chart indicating the physical relationship between the rotational speeds of rotating elements of a power distribution and integration mechanism and torque.

The above equation (1) represents the physical relationship with regard to the rotating elements of the power distribution and integration mechanism 30. FIG. 10 shows an example of alignment chart indicating the physical relationship between the rotational speeds of the rotating elements of the power distribution and integration mechanism 30 and the torques applied thereto. In FIG. 10, the left-side S axis indicates the rotational speed of the sun gear 31 which is equal to the rotational speed Nm1 of the motor MG1, and the middle C axis indicates the rotational speed of the carrier 34 which is equal to the rotational speed Ne of the engine 22, while the right-side R axis indicates the rotational speed Nr of the ring gear 32 obtained by dividing the rotational speed Nm2 of the motor MG2 by the gear ratio Gr of the reduction gear 35. The two thick arrows on the R axis indicate torque applied to the ring gear shaft 32a when the motor MG1 is driven to produce torque Tm1, and torque applied to the ring gear shaft 32a via the reduction gear 35 when the motor MG2 is driven to produce torque Tm2. The above-indicated equation (1) for obtaining the target rotational speed Nm1* of the motor MG1 can be easily derived from the relationship of the rotational speeds as shown in the alignment chart. The above equation (2) is a relational expression for use in feedback control for rotating the motor MG1 at the target rotational sped Nm1*. In the equation (2), "k1" in the second term on the right side is a gain of the proportional term, and "k2" in the third term on the right side is a gain of the integral term.

Referring back to FIG. 3, after the torque command Tm1* to be issued to the motor MG1 is set, the CPU 72 of the hybrid ECU 70 calculates torque limits Tmin, Tmax as the upper and lower limits of torque that can be generated from the motor MG2, according to the following equations (3), (4), using the input and output limits Win, Wout of the battery 50, the torque command Tm1* to the motor MG1 set in step S190, and the current rotational speeds Nm1, Nm2 of the motors MG1, MG2 (step S200).

$$Tmin=(Win-Tm1^* \cdot Nm1)/Nm2 \qquad (3)$$

$$Tmax=(Wout-Tm1^* \cdot Nm1)/Nm2 \qquad (4)$$

Furthermore, the CPU 72 of the hybrid ECU 70 calculates a provisional motor torque Tm2tmp as a provisional value of torque to be generated from the motor MG2, according to the following equation (5), using the required torque Tr*, the torque command Tm1*, the gear ratio ρ of the power distribution and integration mechanism 30, and the gear ratio Gr of the reduction gear 35 (step S210). Then, the CPU 72 of the hybrid ECU 70 sets the torque command Tm2* to be issued to the motor MG2, to a value to which the provisional motor torque Tm2tmp is limited by the torque limits Tmin, Tmax (step S220). By setting the torque command Tm2* to the motor MG2 in this manner, the torque applied to the ring gear shaft 32a can be limited to within the range of the input and output limits Win, Wout of the battery 50.

$$Tm2tmp=(Tr^*+Tm1^*/\rho)/Gr \qquad (5)$$

The above equation (5) can be easily derived from the alignment chart of FIG. 10. If the target speed Ne* and target torque Te* of the engine 22 and the torque commands Tm1*, Tm2* to the motors MG1, MG2 are set in the above mariners, the hybrid ECU 70 transmits the target speed Ne* and target torque Te* to the engine ECU 24, and transmits the torque commands Tm1*, Tm2* of the motors MG1, MG2 to the motor ECU 40 (step S230). Then, the CPU 72 of the hybrid ECU 70 executes step S100 and subsequent steps again. The motor ECU 40, when receiving the torque commands Tm1*, Tm2*, performs switching control of switching devices of the inverters 41, 42 so that the motor MG1 is driven according to the torque command Tm1*, and the motor MG2 is driven according to the torque command Tm2*. Also, the engine ECU 24, when receiving the target speed Ne* and the target torque Te*, performs throttle opening control, fuel injection control, ignition timing control, and so forth, so that the engine 22 operates according to the target engine speed Ne* and the target torque Te*.

If, on the other hand, it is determined in step S140 that the engine 22 is not in operation, the CPU 72 of the hybrid ECU 70 determines whether the operation of the engine 22 should be kept stopped (step S240). It is determined in step S240 that the operation of the engine 22 should be kept stopped, if all of engine stop conditions, such as conditions that the vehicle speed V is equal to or lower than a given vehicle speed that allows intermittent engine operation, and that the required power Pe* is smaller than an engine start threshold value, are satisfied. If it is determined in step S240 that the operation of the engine 22 should not be kept stopped, a certain engine start flag is set to ON (step S245), and the routine of FIG. 3 ends. When the engine start flag is set to ON, an engine-start drive control routine (not shown) is executed by the hybrid ECU 70. According to the engine-start drive control routine, the engine 22 is started with the motor MG1 cranking the engine 22, and the motor MG2 is driven/controlled so as to deliver torque based on the required torque Tr* to the ring gear shaft 32a, while canceling torque as reaction force to driving torque applied to the ring gear shaft 32a due to cranking of the engine 22. If the engine-start drive control routine ends, the engine start flag is set to OFF. If, on the other hand, it is determined in step S240 that the operation of the engine 22 should be kept stopped, the CPU 72 of the hybrid ECU 70 sets each of the target speed Ne* and target torque Te* of the engine 22 and the torque command Tm1* to the motor MG1 to value 0 (step S250), and executes the above-described steps S200-S220. Then, the CPU 72 of the hybrid ECU 70 transmits the target speed Ne* and target torque Te* of the engine 22 to the engine ECU 24, and transmits the torque commands Tm1*, Tm2* of the motors MG1, MG2 to the motor ECU 40 (step S230). Then, the CPU 72 executes step S100 and subsequent steps again.

As explained above, the hybrid vehicle 20 of this embodiment stores, in the ROM 74, a plurality of maps for setting the controlled accelerator pedal stroke which are created for the respective virtual gear ranges SR1-SR6 such that the required torque Tr* corresponding to the same accelerator pedal stroke Acc tends to increase as the vehicle speed V is higher, and the required torque Tr* corresponding to the same accelerator pedal stroke Acc tends to increase as the gear range SR (virtual gear range) is shifted to the lower range when the vehicle speed V is constant. When one of the virtual gear ranges SR1-SR6 is selected by the driver, the controlled accelerator pedal stroke Acc* corresponding to the accelerator pedal stroke Acc obtained by the accelerator pedal position sensor 84 is set using the map for setting the controlled accelerator pedal stroke corresponding to the selected one of the virtual gear ranges SR1-SR6, and the required torque Tr* corresponding to the controlled accelerator pedal stroke Acc* and the vehicle speed V obtained by the vehicle speed sensor 87 is set (steps S110-S130). Then, the engine 22 and the motors MG1, MG2 are controlled so that torque based on the required torque Tr* is applied to the ring gear shaft 32a (steps S140-S250).

Namely, in the illustrated embodiment, the map for setting the controlled accelerator pedal stroke which corresponds to the low-side virtual gear range SR1, for example, is created such that the accelerator pedal stroke Acc obtained by the accelerator pedal position sensor 84 is converted into a larger value (controlled accelerator pedal stroke Acc*) than the actual value as the vehicle speed V is higher, so that the required torque Tr* corresponding to the same accelerator pedal stroke Acc tends to be larger as the vehicle speed V is higher. Also, the map for setting the controlled accelerator pedal stroke which corresponds to the high-side virtual gear range SR6, for example, is created such that the accelerator pedal stroke Acc obtained by the accelerator pedal position sensor 84 is converted into a smaller value (controlled accelerator pedal stroke Acc*) than the actual value as the vehicle speed V is lower, so that the required torque Tr* corresponding to the same accelerator pedal stroke Acc tends to be smaller as the vehicle speed V is lower. Accordingly, the output response of torque for running the vehicle is enhanced as the vehicle speed V is higher when one of the virtual gear ranges SR1-SR6 is selected, and the output response of torque for running the vehicle is enhanced as the gear range SR (virtual gear range) is shifted to a lower range in a condition where the vehicle speed V is constant. Thus, by setting one of the virtual gear ranges SR1-SR6 as the gear range SR, or shifting the gear range SR (virtual gear range) to the lower range, the hybrid vehicle 20 can be accelerated with the enhanced output response of torque for running the vehicle. Also, the required torque Tr* is set to a smaller value as the vehicle speed V is lower when one of the virtual gear ranges SR1-SR6 is selected, and the required torque Tr* is set to a smaller value as the gear range R (virtual gear range) is shifted to a higher range in a condition where the vehicle speed V is constant. Thus, by setting one of the virtual gear ranges SR1-SR6 as the gear range SR, or shifting the gear range SR (virtual gear range) to the higher range, the output of torque for running the vehicle, namely, the fuel consumption rate of the engine 22 and the electric power consumed by the motor MG2, can be reduced, and the energy efficiency can be improved. Consequently, the hybrid vehicle 20 of this embodiment makes it possible to improve the output characteristic of torque for running the vehicle in response to a shifting operation, and also improve the energy efficiency through a shifting operation.

In the hybrid vehicle 20 of the embodiment, the plurality of maps for setting the controlled accelerator pedal stroke corresponding to the respective virtual gear ranges SR1-SR6 are created based on the map (restriction on increase of the operation amount) for setting the controlled accelerator pedal stroke in the power mode, and the map (restriction on reduction of the operation amount) for setting the controlled accelerator pedal stroke in the ECO mode. Namely, when the power mode in which the output response of torque for running the vehicle is prioritized as compared with the normal mode and the ECO mode in which the energy efficiency is prioritized as compared with the normal mode, in addition to the normal mode for normal running, are prepared as the operating modes of the hybrid vehicle 20, the plurality of maps for setting the controlled accelerator pedal stroke corresponding to the virtual gear ranges SR1-SR6 can be more appropriately created, utilizing the map for setting the controlled accelerator pedal stroke in the power mode and the map for setting the controlled accelerator pedal stroke in the ECO mode. If the plurality of maps for setting the controlled accelerator pedal stroke corresponding to the virtual gear ranges SR1-SR6 are created utilizing the map for setting the controlled accelerator pedal stroke in the power mode and the map for setting the controlled accelerator pedal stroke in the ECO mode, the required torque Tr* can be more appropriately set when one of the virtual gear ranges is selected, using a map for setting the required torque in the normal mode, namely, a single map for setting the required torque.

Figure 11:
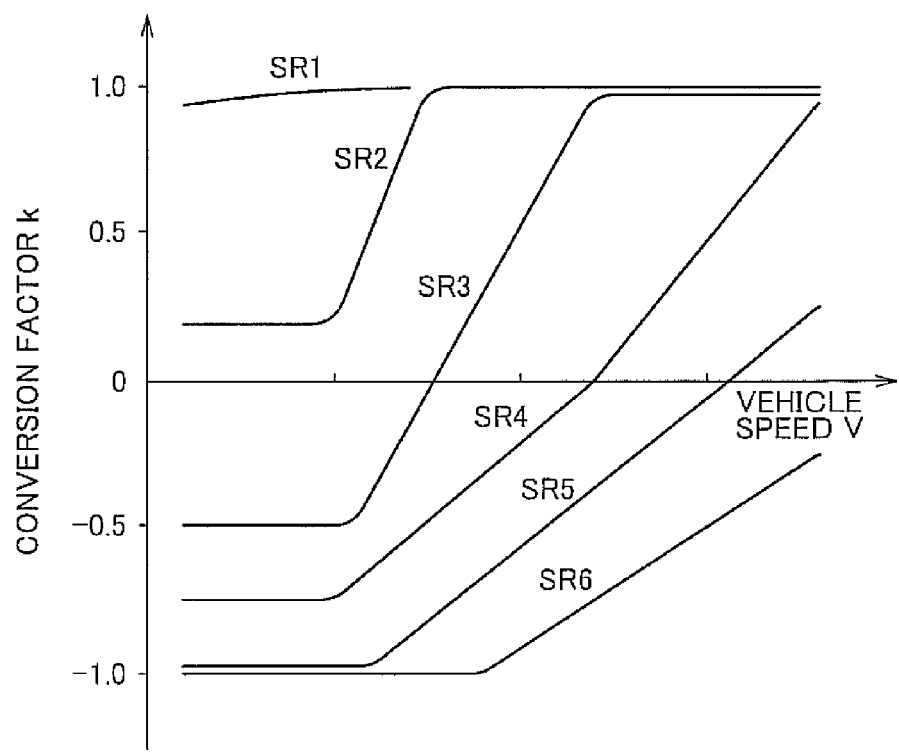
FIG. 11 is an explanatory view showing one example of map for setting a conversion factor.

Instead of preparing the maps for setting the controlled accelerator pedal stroke for the respective virtual gear ranges SR1-SR6, the hybrid vehicle 20 may be equipped with a map for setting a conversion factor, which defines the relationship between the vehicle speed V and the conversion factor k (−1≤k≤1) as shown in FIG. 11, and may set the controlled accelerator pedal stroke Acc* using the map for setting the conversion factor, map for setting the controlled accelerator pedal stroke in the power mode, and the map for setting the controlled accelerator pedal stroke in the ECO mode. In this case, if the conversion factor k corresponding to the vehicle speed V and obtained from the map for setting the conversion factor is a positive value, a value corresponding to the accelerator pedal stroke Acc detected by the accelerator pedal position sensor 84 may be obtained from the map for setting the controlled accelerator pedal stroke in the power mode, and the controlled accelerator pedal stroke Acc* may be set by adding the product of the obtained value and the conversion factor k to the accelerator pedal stroke Acc concerned. If the conversion factor k corresponding to the vehicle speed V and obtained from the map for setting the conversion factor is a negative value, a value corresponding to the accelerator pedal stroke Acc detected by the accelerator pedal position sensor 84 may be obtained from the map for setting the controlled accelerator pedal stroke in the ECO mode, and the controlled accelerator pedal stroke Acc* may be set by adding the product of the obtained value and the conversion factor k to the accelerator pedal stroke Acc concerned.

Figure 12:
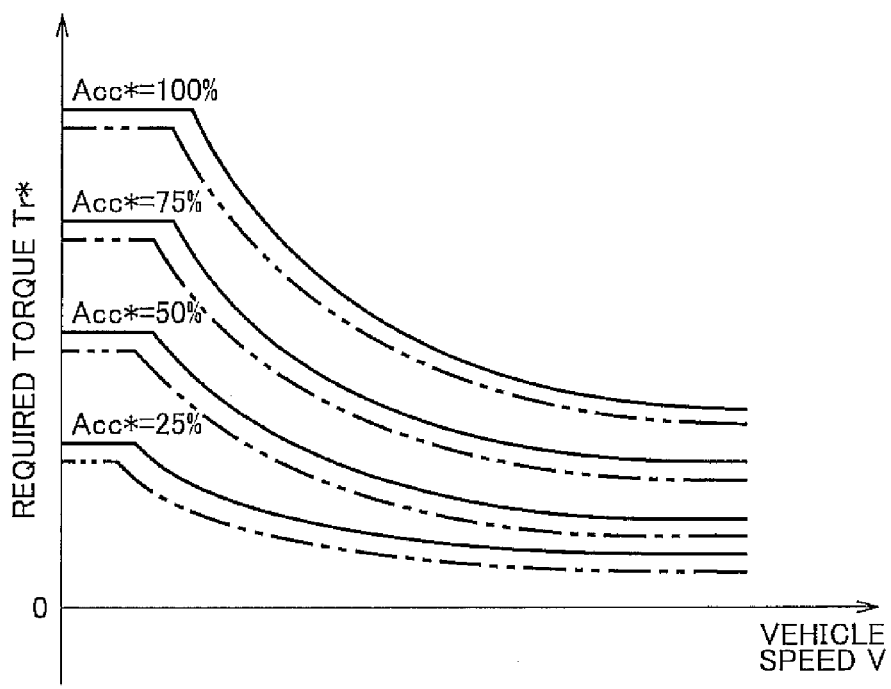
FIG. 12 is an explanatory view showing one example of maps for setting the required torque corresponding to the virtual gear ranges SR1-SR6.
Figure 13:
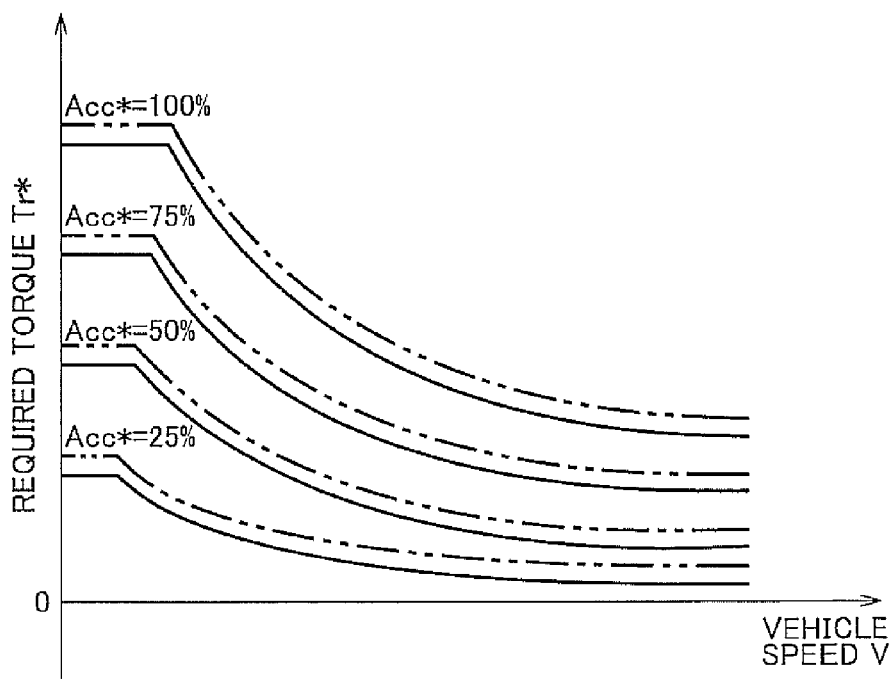
FIG. 13 is an explanatory view showing another example of the maps for setting the required torque corresponding to the virtual gear ranges SR1-SR6.

Instead of preparing the maps for setting the controlled accelerator pedal stroke for the respective virtual gear ranges SR1-SR6, a map for setting the required torque, which defines the relationships among the accelerator pedal stroke Acc, vehicle speed V and the required torque Tr*, may be prepared for each virtual gear range SR1-SR6, using the map for setting the controlled accelerator pedal stroke in the power mode, map for setting the controlled accelerator pedal stroke in the ECO mode, and the map (FIG. 7) for setting the required torque. FIG. 12 shows one example of map for setting the required torque which corresponds to a low-side virtual gear range, and FIG. 13 shows one example of map for setting the required torque which corresponds to a high-side virtual gear range. The two-dot chain lines in FIG. 12 and FIG. 13 indicate the map for setting the required torque as shown in FIG. 7. When the map for setting the required torque is prepared for each of the virtual gear ranges SR1-SR6 in this manner, the hybrid vehicle 20 may skip step S120 of the routine of FIG. 3, and may read a map for setting the required torque corresponding to the gear range SR received in step S100, i.e., the virtual gear range selected by the driver, from the ROM 74, so that the required torque Tr* corresponding to the accelerator pedal stroke Acc and the vehicle speed V is derived from the map for setting the required torque corresponding to the virtual gear range in step S130.

Figure 14:
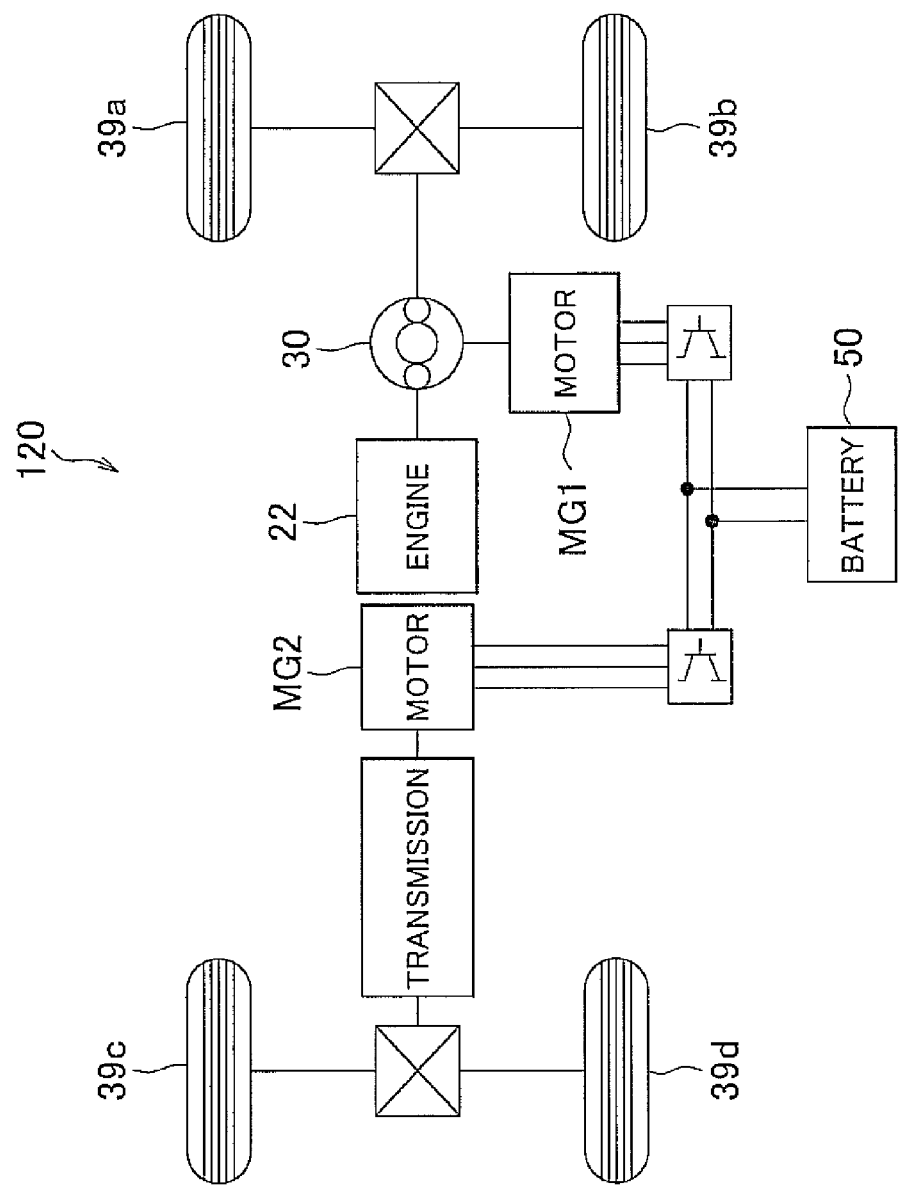
FIG. 14 is a schematic view showing the construction of a hybrid vehicle according to a modified example.

While the ring gear shaft 32a as the drive shaft and the motor MG2 are coupled to each other via the reduction gear 35 in the hybrid vehicle 20 of the illustrated embodiment, a transmission having two speeds (Hi, Lo) or three or more speeds, for example, and operable to change the rotational speed of the motor MG2 and transmit the rotary motion of the motor MG2 to the ring gear shaft 32a may be employed in place of the reduction gear 35. While the hybrid vehicle 20 of this embodiment is arranged to output the power of the motor MG2 to the ring gear shaft 32a via the reduction gear 35 that reduces the speed of the motor MG2, the invention is not limited to this arrangement. Namely, the invention may be applied to a hybrid vehicle 120 as a modified example shown in FIG. 14, in which the power of the motor MG2 is delivered to an axle (connected to wheels 39c, 39d in FIG. 14) that is different from an axle (to which wheels 39a, 39b are connected) that is connected to the ring gear shaft 32a. Needless to say, the invention may be applied to an electric vehicle having only an electric motor or motors as a source of power for running the vehicle.

In the illustrated embodiment and modified example, the motor MG2 operable to deliver power to the ring gear shaft 32a coupled to the wheels 39a, 39b as driving wheels may correspond to the electric motor according to the invention, and the battery 50 operable to supply and receive electric power to and from the motor MG2 may correspond to the electric storage means (electric storage device) according to the invention, while the accelerator pedal position sensor 84 that detects the accelerator pedal stroke Acc or the amount of depression of the accelerator pedal by the driver may correspond to the accelerator operation amount obtaining means (accelerator operation amount obtaining device) according to the invention. The vehicle speed sensor 87 that detects the vehicle speed V may correspond to the vehicle speed obtaining means (vehicle speed obtaining device) according to the invention, and the shift lever 81 that permits the driver to select a desired gear range SR from the D range for normal running and a plurality of virtual gear ranges SR1-SR6 may correspond to the gear range selecting means (gear range selecting device) according to the invention, while the ROM 74 that stores a plurality of maps for setting the controlled accelerator pedal stroke prepared for the respective virtual gear ranges SR1-SR6 may correspond to the restriction storing means (restriction storing device) according to the invention. The hybrid ECU 70 that executes steps S110-S130 of the routine of FIG. 3 may correspond to the required driving force setting means (required driving force setting device) according to the invention, and a combination of the hybrid ECU 70 that executes steps S140-S250 of FIG. 3, the engine ECU 24 and the motor ECU 40 may correspond to the control means (control device) according to the invention. Also, the power switch 88 and the ECO switch 89 may correspond to the operating mode selecting means (operating mode selecting device) according to the invention, and the hybrid ECU 70 may correspond to the controlled accelerator operation amount setting means (controlled accelerator operation amount setting device) according to the invention. The engine 22 may correspond to the internal combustion engine according to the invention, and the motor MG1 may correspond to the second electric motor according to the invention, while the power distribution and integration mechanism 30 may correspond to the power distributing means (power distributing device) according to the invention.

It is to be understood that the electric motor and the second electric motor are not limited to the synchronous generator-motors like the motors MG1, MG2, but may be of any other type, such as an induction motor. The electric storage means is not limited to the secondary battery like the battery 50, but may be of any other type, such as a capacitor. The accelerator operation amount obtaining means may be of any type provided that it is able to obtain the amount of operation of the accelerator pedal by the driver. The vehicle speed obtaining means may be of any type provided that it is able to obtain the vehicle speed. The gear range selecting means may be of any type other than the shift lever 81, like the one with which a desired gear range is selected at the push of a button, provided that it permits the driver to select a given gear range from the normal running range and a plurality of virtual gear ranges. The restriction storing means may be of any type provided that it stores a plurality of restrictions created for the respective virtual gear ranges, so that the required driving force corresponding to the same accelerator operation amount tends to be increased as the vehicle speed is higher, and the required driving force corresponding to the same accelerator operation amount tends to be increased as the virtual gear range is shifted to a lower range when the vehicle speed is constant. The required driving force setting means may be of any type provided that, when one of the virtual gear ranges is selected by the driver, it sets the required driving force corresponding to the accelerator operation amount obtained by the accelerator operation amount obtaining means and the vehicle speed obtained by the vehicle speed obtaining means, using the restriction corresponding to the selected virtual gear range. The control means may be of any type, such as a single electronic control unit, other than the combination of the hybrid ECU 70, engine ECU 24 and the motor ECU 40, provided that it controls the electric motor, etc. so that power based on the required driving force is delivered to the drive shaft. The operating mode selecting means may be of any type, such as a single switch, other than the combination of the power switch 88 and ECO switch 89, provided that it permits the driver to select a desired operating mode from a first operating mode for normal running, a second operating mode in which the output response of driving force for running the vehicle is prioritized, and a third operating mode in which the energy efficiency is prioritized. The internal combustion engine is not limited to the engine 22 that generates power when a hydrocarbon fuel, such as gasoline or light oil, is supplied thereto, but may be of any other type, such as a hydrogen engine. The power distributing means may be of any type, such as a double-pinion type planetary gear mechanism or a differential gear, other than the power distribution and integration mechanism 30, provided that it is connected to three shafts, i.e., an engine shaft of the internal combustion engine, a rotating shaft of the first electric motor, and the drive shaft that transmits power to the driving wheels, and delivers or receives power based on the power delivered to or received from two shafts out of the three shafts, to or from the remaining shaft.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle, comprising:
   an electric motor that delivers power to a drive shaft coupled to driving wheels;
   an electric storage device that supplies and receives electric power to and from the electric motor;
   an accelerator operation amount obtaining device that obtains an accelerator operation amount as an amount of operation of an accelerator pedal by a driver;
   a vehicle speed obtaining device that obtains a vehicle speed;
   a gear range selecting device that permits the driver to select a desired gear range from a normal running range and a plurality of virtual gear ranges;
   a restriction storing device that stores a plurality of restrictions that are created for the respective virtual gear ranges, so that, in each of said plurality of virtual gear ranges, a required driving force as a driving force to be applied to the drive shaft corresponding to the same accelerator operation amount, increases as the vehicle speed increases, and the required driving force, corresponding to the same accelerator operation amount increases as the virtual gear range is shifted to a lower range when the vehicle speed is constant;
   a required driving force setting device, when one of the virtual gear ranges is selected by the driver, that sets the required driving force corresponding to the accelerator operation amount obtained by the accelerator operation amount obtaining device and the vehicle speed obtained by the vehicle speed obtaining device, using the restriction corresponding to the selected virtual gear range; and a control device that controls the electric motor so that power based on the required driving force set by the required driving force setting device is delivered to the drive shaft.

2. The vehicle according to claim 1, wherein the normal running range is a drive range for forward running of the vehicle.

3. The vehicle according to claim 1, wherein:
at least one of said plurality of restrictions corresponding to a predetermined first one of the virtual gear ranges is created such that the accelerator operation amount obtained by the accelerator operation amount obtaining device is converted into a larger value than an actual value as the vehicle speed is higher, so that the required driving force corresponding to the same accelerator operation amount tends to be increased as the vehicle speed is higher;
at least one of said plurality of restrictions corresponding to a predetermined second one of the virtual gear ranges is created such that the accelerator operation amount obtained by the accelerator operation amount obtaining device is converted into a smaller value than the actual value as the vehicle speed is lower, so that the required driving force corresponding to the same accelerator operation amount tends to be reduced as the vehicle speed is lower; and
the predetermined first one of the virtual gear ranges is a lower virtual gear range as compared to the predetermined second one of the virtual gear ranges.

4. The vehicle according to claim 1, further comprising:
an operating mode selecting device that permits the driver to select a desired operating mode from a first operating mode for normal running, a second operating mode in which an output response of the driving force for running the vehicle is prioritized as compared with the first operating mode, and a third operating mode in which energy efficiency is prioritized as compared with the first and second operating modes; and
a controlled accelerator operation amount setting device that sets a controlled accelerator operation amount to the accelerator operation amount obtained by the accelerator operation amount obtaining device when the normal running range is selected and the first operating mode is selected by the driver, sets the controlled accelerator operation amount corresponding to the accelerator operation amount obtained by the accelerator operation amount obtaining device according to a given restriction on increase of the operation amount, such that the controlled accelerator operation amount tends to be larger than the accelerator operation amount, when the normal running range is selected and the second operating mode is selected by the driver, and sets the controlled accelerator operation amount corresponding to the accelerator operation amount obtained by the accelerator operation amount obtaining device according to a given restriction on reduction of the operation amount, such that the controlled accelerator operation amount tends to be smaller than the accelerator operation amount, when the normal running range is selected and the third operating mode is selected by the driver,
wherein said plurality of restrictions are created based on the given restriction on increase of the operation amount and the given restriction on reduction of the operation amount, and
wherein, when the normal running range is selected by the driver, the required driving force setting device sets the required driving force, using a restriction in setting of the required driving force for normal running, which defines relationships among the controlled accelerator operation amount, the vehicle speed and the required driving force, the controlled accelerator operation amount set by the controlled accelerator operation amount setting device, and the vehicle speed obtained by the vehicle speed obtaining device.

5. The vehicle according to claim 4, wherein:
said plurality of restrictions are a plurality of restrictions in setting of the controlled accelerator operation amount, each of which is created so as to define a relationship between the accelerator operation amount obtained by the accelerator operation amount obtaining device and the controlled accelerator operation amount with respect to the respective virtual gear ranges, based on the given restriction on increase of the operation amount and the given restriction on reduction of the operation amount;
when one of the virtual gear ranges is selected by the driver, the controlled accelerator operation amount setting device sets the controlled accelerator operation amount using the restriction in setting of the controlled accelerator operation amount corresponding to the selected virtual gear range and the accelerator operation amount obtained by the accelerator operation amount obtaining device; and
when one of the virtual gear ranges is selected by the driver, the required driving force setting device sets the required driving force, using the restriction in setting of the required driving force for normal running, the controlled accelerator operation amount set by the controlled accelerator operation amount setting device, and the vehicle speed obtained by the vehicle speed obtaining device.

6. The vehicle according to claim 4, wherein:
said plurality of restrictions are a plurality of restrictions in setting of the required driving force, each of which is created so as to define relationships among the accelerator operation amount, the vehicle speed and the required driving force with respect to the respective virtual gear ranges, based on the given restriction on increase of the operation amount, the given restriction on reduction of the operation amount, and the restriction in setting of the required driving force for normal running; and
when one of the virtual gear ranges is selected by the driver, the required driving force setting device sets the required driving force, using the restriction in setting of the required driving force corresponding to the selected virtual gear range, the accelerator operation amount obtained by the accelerator operation amount obtaining device, and the vehicle speed obtained by the vehicle speed obtaining device.

7. The vehicle according to claim 1, further comprising:
an internal combustion engine;
a second electric motor that delivers and receives power; and
a power distributing device that is connected to three shafts including an output shaft of the internal combustion engine, a rotating shaft of the second electric motor and the drive shaft, and is operable to deliver or receive power based on power received from or delivered to two of the three shafts, to or from the remaining shaft,
wherein the control device controls the internal combustion engine, the electric motor and the second electric motor so that power based on the required driving force set by the required driving force setting device is delivered to the drive shaft.

8. A method of controlling a vehicle including an electronic control unit, an electric motor that delivers power to a drive shaft coupled to driving wheels, an electric storage device that supplies and receives electric power to and from the electric motor, an accelerator operation amount obtaining device that obtains an accelerator operation amount as an amount of operation of an accelerator pedal by a driver, a vehicle speed obtaining device that obtains a vehicle speed, and a gear range selecting device that permits the driver to select a desired gear range from a normal running range and a plurality of virtual gear ranges, comprising:

when one of the virtual gear ranges is selected by the driver, extracting, by the electronic control unit, a restriction corresponding to the virtual gear range selected by the driver, from a plurality of restrictions that are created for the respective virtual gear ranges, such that, in each of said plurality of virtual gear ranges a required driving force as a driving force to be applied to the drive shaft, which corresponds to the same accelerator operation amount, increases as the vehicle speed increases, and the required driving force corresponding to the same accelerator operation amount increases as the virtual gear range is shifted to a lower range when the vehicle speed is constant, and setting, by the electronic control unit, the required driving force corresponding to the accelerator operation amount obtained by the accelerator operation amount obtaining device and the vehicle speed obtained by the vehicle speed obtaining device, using the extracted restriction; and controlling, by the electronic control unit, the electric motor so that power based on the set required driving force is delivered to the drive shaft.

9. The method according to claim 8, wherein the normal running range is a drive range for forward running of the vehicle.

* * * * *